March 7, 1967 C. W. WENGER 3,307,501
PELLET MILL

Filed July 13, 1965 2 Sheets-Sheet 1

INVENTOR
Clyde W. Wenger
BY
Hovey, Schmidt, Johnson & Hovey
ATTORNEYS.

March 7, 1967 C. W. WENGER 3,307,501
PELLET MILL

Filed July 13, 1965 2 Sheets-Sheet 2

INVENTOR
Clyde W. Wenger

BY Hovey, Schmidt, Johnson & Hovey
ATTORNEYS ic # United States Patent Office 3,307,501
Patented Mar. 7, 1967

3,307,501
PELLET MILL
Clyde W. Wenger, Sabetha, Kans., assignor to Wenger Manufacturing, Inc., Sabetha, Kans., a corporation of Kansas
Filed July 13, 1965, Ser. No. 471,587
6 Claims. (Cl. 107—14)

This invention relates to a rotatable die pellet mill having means to control speed of rotation to in turn control pellet length.

Production of so-called "range cubes" (usually about ¾" in diameter and 2" in length) is most difficult with high speed ring type dies because they break up into shorter particles by centrifugal force. Ideally then, one would select a mill having a stationary die. But this presents the problem of needing an expensive, complicated cutter assembly rotating around the die to sever the extrusions into desired pellet lengths.

It follows then that the best arrangement for range cubes is to provide stationary cutters around the die with the latter rotating slowly enough to avoid the centrifugal force problem. While maximum production cannot be expected at the slower speeds, such sacrifice would have to be expected in order to attain good results, insofar as relatively long pellets is concerned.

One difficulty with using a die rotating at a slow fixed speed is that the nature of the material varies. Under certain conditions then, capacity could be increased by faster speeds of rotation while still producing a desirable range cube. Another disadvantage is that such construction does not lend itself to producing a wide range of shorter pellets.

Hence, it is the primary object of the instant invention to provide a pellet mill having its die driven solely by the friction of material between the roller unit and the die, and to then control the speed of the die, all to the end that the nature of the pellet (both length and density) may be infinitely varied at the will of the operator.

Still another object of the present invention is to provide a trouble-free control that is simple and inexpensive to manufacture, easily operated, highly sensitive and having low cost maintenance characteristics.

Figure 1:
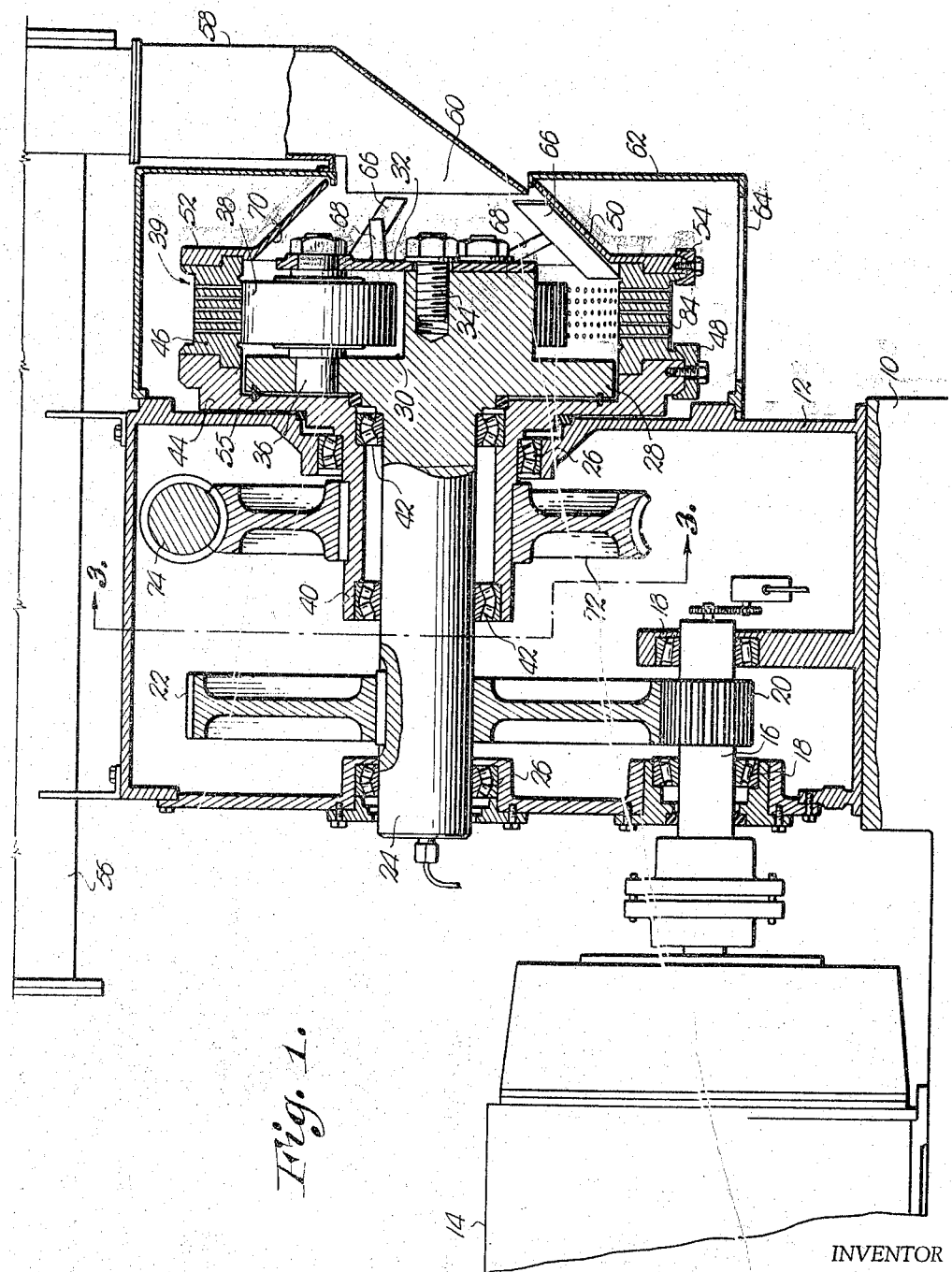
FIGURE 1 is a central, vertical cross-sectional view, partially in elevation, of a pellet mill made pursuant to my present invention.
Figure 2:
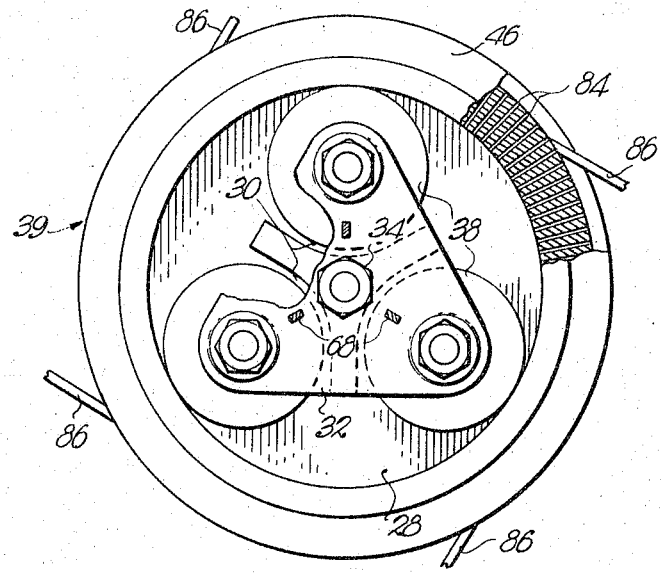
FIG. 2 is a front view of the extrusion head, broken away for clearness.
Figure 3:
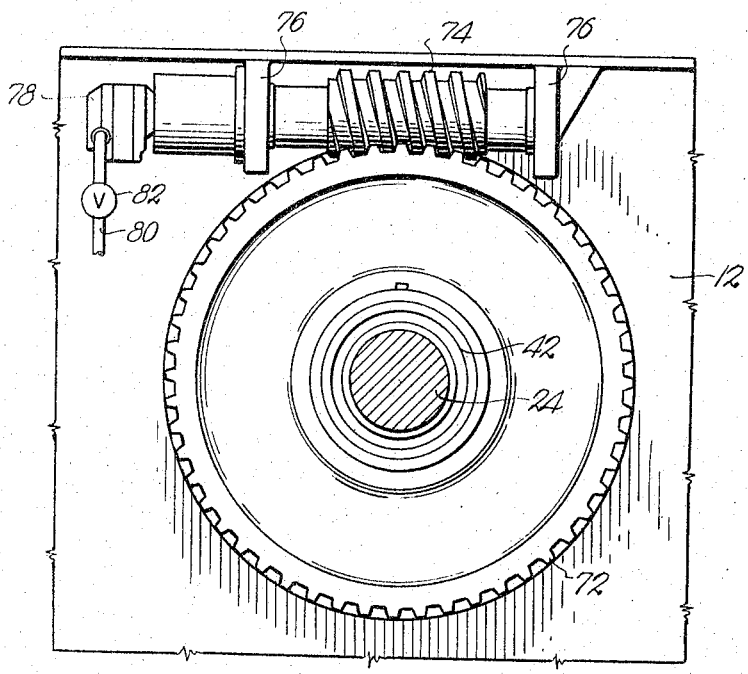
FIG. 3 is a fragmentary vertical cross-sectional view taken along irregular line 3—3 of FIG. 1.

Base 10 supports framework 12 and other components of the mill. An electric motor 14 drives a shaft 16 journalled in bearings 18. Shaft 16 has a gear 20 in mesh with a gear 22 on a driven shaft 24 journalled in bearings 26. A quill 28, integral with shaft 24, has three roller cavities 30, and a triangular plate 32 is secured to quill 28 by a bolt 34.

Three axles 36, disposed in respective cavities 30, and a triangular plate 32 is secured to quill 28 by a bolt 34.

Three axles 36, disposed in respective cavities 30, and spanning the distance between quill 28 and plate 32, rotatably mount rollers 38, thereby forming the roller unit of extrusion head 39.

A sleeve 40, coaxial with shaft 24 and telescoped thereover, is free to rotate with respect to shaft 24 on bearings 42. Sleeve 40 is flanged as at 44 and serves to mount a perforated, annular extrusion die 46 via clamps 48. A frusto-conical hopper 50 is flared at 52 and secured to die 46 by clamps 54. Clamps 48 and 54 comprise segments which are disposed around the die to securely maintain flange 44, die 46 and hopper 50 together as a unit. An annular seal 55 is disposed between flange 44 and quill 28 to prevent damage to bearings 42 by the material to be pelleted.

A mixing cylinder 56, shown fragmentarily in FIG. 1, receives the material prior to its passage into head 39 via chute 58. Cylinder 56 may comprise the mixing component of a conventional combination steam conditioner and high speed mixer and may be fed by a variable speed feeder.

Outlet 60 of chute 58 is aligned with the common axes of shaft 24, sleeve 40 and hopper 50. An annular housing 62, surrounding extrusion head 39 and hopper 50, has a pellet outlet 64. Three paddles 66, secured to plate 32 by arms 68, and closely spaced from the internal surface 70 of hopper 50, are inclined to clear hopper 50 upon relative movement of the roller unit and the die 46.

A worm gear 72, rigid with sleeve 40, is in mesh with a worm 74 that is journalled in bearings within brackets 76 which also mount a hydraulic motor 78 operably coupled with worm 74. Fluid is transmitted to motor 78 by a supply line 80, the speed of the motor being governed by a variable fluid flow control valve 82 interposed in line 80.

Tight metal-to-metal contact of rollers 38 with die 46 is unnecessary in the instant invention, it being preferred that such contact be avoided in order to lengthen the useful life of die 46. Four stationary knives 86 are employed to sever the pellets emanating from radial extrusion openings 84 of die 46.

In operation, motor 14 drives shaft 24 at a constant speed; hence, the roller unit which includes rollers 38 also rotates at a constant speed. However, worm gear 72 and worm 74 may be selected such that the gear ratio thereof is sufficiently high to lock sleeve 40, and thus prevent rotation of die 46, until a rotative driving force is supplied to worm 74 by hydraulic motor 78. Die 46 is driven by the friction of feed material between the roller unit and the die unit 46, motor 78 serving only as a means of releasing worm 74 and worm gear 72 to permit rotation of die 46 by the action of the material within extrusion head 39.

It is only required that motor 78 comprise a relatively low output power source since its sole function is to drive gears 72 and 74 and thereby affect the forces tending to rotate die 46 in the same direction as shaft 24. The speed of motor 78 is governed by the setting of valve 82, thereby providing infinite variation of the speed of die 46. As valve 82 is progressively opened to increase the pressure and quantity of the hydraulic fluid delivered to motor 78, a point is ultimately reached where motor 78 begins to rotate worm 74 since gears 72 and 74 place progressively less drag on die rotation with increasing speed. Although the hydraulically controlled worm and worm gear arrangement shown and described is preferred, it should be understood that a variable speed electric motor could be utilized to drive worm 74, or, alternatively, a brake band surrounding sleeve 40 could be employed to retard the speed of die 46.

A suggested speed for shaft 24 is 350 r.p.m. with the speed of the die 46 variable between 12 and 70 r.p.m. As the speed of the die 46 increases, and hence the speeds of the two rotating units of the extrusion head 39 become more nearly equalized, the pellet length decreases. Conversely, the speed of die 46 may be reduced for longer pellets, all depending, of course, upon the type of product being pelleted, its condition and such factors as ambient temperature and humidity.

From the foregoing it is now apparent that by virtue of the relative rotation between the die unit and the rotary unit, their relative positions do not remain constant but are ever changing. The important and advantageous result is equalization of wear, particularly in the die. This is to be distinguished from previous attempts to produce range cubes from stationary die pellet mills, which present the added problem of unequal wear.

Still further, in the pellet mill of the instant invention, the die and the roller assembly rotate about fixed axes and as a consequence, proper adjustment can eliminate metal-to-metal contact. That is to say, the rollers do not contact the face of the die and there is no resultant peening action which tends to close the extrusion holes as in the case of a pellet mill wherein the die is permitted to shift radially away from the normal axis of rotation and into engagement with the rollers.

Having thus described the invention, what is claimed as new and desired to be secured by Letters Patent is:

1. In a pellet mill:
   a rotatable shaft;
   power means coupled with said shaft for driving the latter;
   a sleeve telescoped over said shaft and rotatable with respect thereto;
   an extrusion head having a perforated, annular die carried by said sleeve and rotatable therewith, and a roller assembly within said die and coupled with said shaft for rotation thereby;
   means operably associated with said head for directing material to be pelleted into said die, whereby the die is driven by the roller assembly by friction of said material between the assembly and the die; and
   means coupled with said sleeve for controlling the speed of rotation thereof and hence the speed of the die, whereby a desired difference in the speeds of rotation of the die and the roller assembly may be maintained during the pelleting operation.

2. The invention of claim 1, wherein said speed control means includes selectively operable mechanism for maintaining said sleeve at any one of a number of speeds of rotation less than the rotative speed of said shaft.

3. The invention of claim 1, wherein said speed control means includes releasable structure for holding said sleeve against rotation.

4. The invention of claim 3, wherein said structure comprises a worm gear rigid with said sleeve and a worm engaging said gear.

5. The invention of claim 4, wherein said speed control means further includes means coupled with said worm for driving the latter at a controllable rotative speed, whereby to permit controlled rotation of the die.

6. The invention of claim 1, wherein said sleeve is elongated and provided with a radially outwardly extending flange at one end thereof mounting said die in coaxial relationship to said sleeve, said material directing means including a frusto-conical, inwardly facing hopper coaxial with said die, means securing the hopper to the die, and a plurality of paddles carried by said roller assembly for rotation therewith, said paddles being disposed in closely spaced relationship to the internal surface of said hopper and inclined to clear the latter during relative movement of the roller assembly and the die.

References Cited by the Examiner

UNITED STATES PATENTS

| | | | |
|---|---|---|---|
| 1,467,883 | 9/1923 | Sizer | 107—14 |
| 1,848,332 | 3/1932 | Estes | 107—14 |
| 1,994,371 | 3/1935 | Sizer | 107—8 |
| 2,063,404 | 12/1936 | Selman | 107—8 |
| 2,162,647 | 6/1939 | Sizer | 107—8 |
| 2,295,838 | 9/1942 | Glaze | 107—8 |
| 2,908,038 | 10/1959 | Meakin | 18—12 |
| 3,108,055 | 10/1963 | Grant | 107—14 XR |
| 3,207,091 | 9/1965 | Cunningham | 107—14 |

BILLY J. WILHITE, *Primary Examiner.*